(12) United States Patent
Lee et al.

(10) Patent No.: US 8,644,838 B2
(45) Date of Patent: Feb. 4, 2014

(54) APPARATUS AND METHOD FOR CONTROLLING TRANSMISSION POWER IN A WIRELESS COMMUNICATION SYSTEM USING FRACTIONAL FREQUENCY REUSE

(75) Inventors: Wook Bong Lee, Anyang-si (KR); Han Gyu Cho, Anyang-si (KR); Ja Ho Koo, Anyang-si (KR); Bin Chul Ihm, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 12/944,625

(22) Filed: Nov. 11, 2010

(65) Prior Publication Data

US 2011/0111789 A1    May 12, 2011

Related U.S. Application Data

(60) Provisional application No. 61/260,019, filed on Nov. 11, 2009.

(30) Foreign Application Priority Data

Mar. 26, 2010    (KR) .................. 10-2010-0027213

(51) Int. Cl.
*H04W 40/00*    (2009.01)
(52) U.S. Cl.
USPC ................. 455/447; 455/522; 455/453
(58) Field of Classification Search
USPC ............ 455/522, 447, 466, 450–451, 452.1, 455/452.2
See application file for complete search history.

(56) References Cited

U.S. PATENT DOCUMENTS

| | | | | |
|---|---|---|---|---|
| 8,340,677 | B2 * | 12/2012 | Ma et al. | 455/452.1 |
| 2009/0061778 | A1 * | 3/2009 | Vrzic et al. | 455/62 |
| 2009/0069026 | A1 * | 3/2009 | Cho et al. | 455/450 |
| 2010/0034157 | A1 * | 2/2010 | Stolyar et al. | 370/329 |
| 2010/0103906 | A1 * | 4/2010 | Montojo et al. | 370/335 |
| 2010/0119071 | A1 * | 5/2010 | Tsai et al. | 380/268 |
| 2012/0157155 | A1 * | 6/2012 | Cho et al. | 455/522 |
| 2013/0109401 | A1 * | 5/2013 | Ma et al. | 455/452.1 |

FOREIGN PATENT DOCUMENTS

| | | | |
|---|---|---|---|
| KR | 1020090026896 | | 3/2009 |
| KR | 1020090084916 | | 8/2009 |
| KR | 1020090088298 | | 8/2009 |
| WO | WO 2008057898 | * | 5/2008 |

OTHER PUBLICATIONS

Srinivasan et al., Jul. 27, 2009, IEEE 802.16m System Description Document (SDD), IEEE 802.16m-09/0034, pp. 148-151.*

* cited by examiner

*Primary Examiner* — Nay A Maung
*Assistant Examiner* — Angelica M Perez
(74) *Attorney, Agent, or Firm* — Lee, Hong, Degerman, Kang & Waimey

(57) ABSTRACT

A method for acquiring FFR power pattern of Frequency Partitions (FPs) at a mobile station (MS) in a wireless communication system using Fractional Frequency Reuse (FFR) is disclosed. The method includes receiving a preamble from a base station (BS); and acquiring a FFR power pattern for a reuse-1 partition and reuse-N partitions using the received preamble, wherein the FFR power pattern is determined based on a segment identifier (ID), the reuse-N partitions include N frequency partitions, each frequency partition has a power level with a range of FP1_power level to FPN_power level, a power-boosted FP in the reuse-N partitions is a partition whose power level is the FP1_power level.

14 Claims, 5 Drawing Sheets

APPARATUS AND METHOD FOR CONTROLLING TRANSMISSION POWER IN A WIRELESS COMMUNICATION SYSTEM USING FRACTIONAL FREQUENCY REUSE

CROSS-REFERENCE TO RELATED APPLICATIONS

Pursuant to 35 U.S.C. §119, this application claims the benefit of earlier filing date and right of priority to Korean Patent Application No. 10-2010-0027213, filed on Mar. 26, 2010, and also claims the benefit of priority to Provisional Application No. 61/260,019, filed on Nov. 11, 2009, the contents of which are all incorporated by reference herein in their entirety.

BACKGROUND OF THE INVENTION

1. Field of the Invention

The present invention relates to a wireless communication system, and more particularly, to a method and apparatus for controlling transmission power in a wireless communication system using Fractional Frequency Reuse (FFR).

2. Discussion of the Related Art

A multi-carrier Orthogonal Frequency Division Multiple Access (OFDMA) system allocates resources in units of sub-channels each including subcarriers. Since multiple users share total subcarriers, multi-user diversity gain can be achieved in the frequency domain. An OFDMA-based broadband mobile Internet access system such as a Wireless Broadband (WiBro) system can maximize throughput by reusing the same frequency in all cells and applying Adaptive Modulation and Coding (AMC) according to received signal strengths and inter-cell interference.

A geographical coverage unit is called a cell or sector and frequency switching between cells to continue an on-going call is called handoff. Frequency reuse is essential to a cellular system. A frequency reuse factor is calculated by dividing the number of cells or sectors using the same frequency simultaneously by the total number of cells in a multi-cell structure.

A $1^{st}$ Generation (1G) system (e.g. Advanced Mobile Phone Service (AMPS)) has a frequency reuse factor smaller than 1. For example, the frequency reuse factor is $1/7$ in 7-cell frequency reuse. The frequency reuse factor is higher in a $2^{nd}$ Generation (2G) system (e.g. Code Division Multiple Access (CDMA) and Time Division Multiple Access (TDMA)) than in the 1G system. For instance, a Global System for Mobile communications (GSM) system operating Frequency Division Multiple Access (FDMA) and TDMA in combination boasts a frequency reuse factor of up to 4 or 3. A 2G CDMA or $3^{rd}$ generation (3G) Wideband CDMA (WCDMA) system may support a frequency reuse factor of 1, thus increasing spectral efficiency and reducing network deployment cost.

The frequency reuse factor of 1 can be achieved when all sectors within a cell and all cells within a network operate on the same frequency channel. Nonetheless, even a system with the frequency reuse factor of 1 may suffer from poor throughput at a cell edge or sector edge due to severe interference between neighbor cells and thus may face service outage. That is, signal reception performance is poor for users at a cell edge because of inter-cell interference.

In OFDMA, a channel is divided into subchannels and a signal is transmitted on subchannels. Unlike 3G (CDMA2000 or WCDMA), an entire channel is not occupied for signal transmission. Throughput may be increased at the same time for users at a cell center and users at a cell edge by taking advantage of this feature.

To be more specific, a cell center is an area close to a Base Station (BS) that is relatively immune to co-channel interference. Thus users at the cell center may operate on all available subchannels. On the other hand, users at a cell edge are only allowed to operate on a fraction of all available subchannels. Fractions of sub-channels are allocated in such a way that neighbor cells' edges will operate on different subchannels. This is called FFR. The co-channel interference between neighbor cells can be mitigated by orthogonally dividing total subcarriers into a plurality of Frequency Partitions (FPs) and deploying the FAs such that each cell does not use a certain FA or uses the certain FA at a low power level.

SUMMARY OF THE INVENTION

Accordingly, the present invention is directed to a method for controlling transmission power at a mobile station (MS) in a wireless communication system using fractional frequency reuse that substantially obviates one or more problems due to limitations and disadvantages of the related art.

An object of the present invention is to provide a method and apparatus for controlling transmission power in a wireless communication system using Fractional Frequency Reuse (FFR).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for acquiring Fractional Frequency Reuse (FFR) power pattern of Frequency Partitions (FPs) at a mobile station (MS) in a wireless communication system using the FFR includes receiving a preamble from a base station (BS); and acquiring a FFR power pattern for a reuse-1 partition and reuse-N partitions using the received preamble, wherein the FFR power pattern is determined based on a segment identifier (ID), the reuse-N partitions include N frequency partitions, each frequency partition has a power level with a range of FP1_power level to FPN_power level, a power-boosted FP in the reuse-N partitions is a partition whose power level is the FP1_power level.

The method may further comprise receiving control information from the base station through the reuse-1 partition or the power-boosted FP in the reuse-N partitions.

The N is 2 or 3.

The FFR power pattern is determined by equation A, $$k = \text{segment ID} + 1 \qquad \text{[Equation A]}$$

Where, the k is an index of the FFR power pattern.

In another aspect of the present invention, a method for controlling transmission power of FPs at a base station (BS) in a wireless communication system using FFR includes selecting one of FFR power patterns; and transmitting a preamble to a mobile station (MS), wherein the FFR power pattern include power pattern of a reuse-1 partition and reuse-N partitions, the FFR power pattern is determined based on a segment identifier (ID), the reuse-N partitions include N frequency partitions, each frequency partition has a power level with a range of FP1_power level to FPN_power level, a power-boosted FP in the reuse-N partitions is a partition whose power level is the FP1_power level.

The method may further comprise transmitting control information from the mobile station through the reuse-1 partition or the power-boosted FP in the reuse-N partitions.

Wherein the N is 2 or 3.

The FFR power pattern is determined by equation A, $$k = \text{segment ID} + 1 \qquad \text{[Equation A]}$$

Where, the k is an index of the FFR power pattern.

In another aspect of the present invention, a MS apparatus in a wireless communication system using FFR includes a radio frequency (RF) unit for receiving a preamble from a base station (BS); and a processor unit for acquiring a FFR power pattern for a reuse-1 partition and reuse-N partitions using the received preamble, wherein the FFR power pattern is determined based on a segment identifier (ID), the reuse-N partitions include N frequency partitions, each frequency partition has a power level with a range of FP1_power level to FPN_power level, a power-boosted FP in the reuse-N partitions is a partition whose power level is the FP1_power level.

In a further aspect of the present invention, an BS apparatus in a wireless communication system using FFR includes a processor unit for selecting one of FFR power patterns; and a radio frequency (RF) unit for transmitting a preamble to a mobile station (MS), wherein the FFR power pattern include power pattern of a reuse-1 partition and reuse-N partitions, the FFR power pattern is determined based on a segment identifier (ID), the reuse-N partitions include N frequency partitions, each frequency partition has a power level with a range of FP1_power level to FPN_power level, a power-boosted FP in the reuse-N partitions is a partition whose power level is the FP1_power level.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Embodiments of the present invention can be supported by standard documents disclosed for at least one of wireless access systems, that is, an Institute of Electrical and Electronics Engineers (IEEE) 802.16m system, a 3$^{rd}$ Generation Partnership Project (3GPP) system, a 3GPP Long Term Evolution (LTE) system, and a 3GPP2 system. In other words, steps or parts that are not described to clarify the technical spirit of the present invention can be supported by the standard documents. Also, all the phraseology and terminology used herein can be explained by the standard documents.

In the following description, specific terms are used to help understanding of the present invention and they can be replaced with other terms within the scope and spirit of the present invention.

The term used herein, 'Base Station (BS)' may be called 'cell' or 'sector', when 'BS' is used in a geographical sense. A serving BS (cell) is a BS providing major legacy services to a Mobile Station (MS). In this context, the serving BS (cell) may be referred to as an anchor BS (cell). Similarly, the term 'neighbor BS' is interchangeable with 'neighbor cell', when 'neighbor BS' is used in a geographical sense. A cell or sector refers to a basic network entity that performs Fractional Frequency Reuse (FFR). The terms 'cell' and 'sector' are interchangeable with each other in the sense that they provide a service to a cell-edge MS based on FFR.

To implement FFR scheme in a multi-cell environment, each BS may use different frequency bands (or Frequency Partitions (FPs)) on a subchannel. However, some tones are commonly used in all sectors and thus have a frequency reuse factor of 1. On the other hand, other tones are not used commonly used in all sectors but used in ⅓ the all sectors and thus have a frequency reuse factor of 3. The frequency reuse factor may vary with network settings. To effectively implement FFR scheme, FFR configuration information should be shared between BSs and/or MSs.

Each cell using FFR scheme may or may not boost transmission power in a specific frequency band.

According to the present invention, frequency resources available to each cell in servicing MSs may be divided into a plurality of frequency resource groups. Frequency resource groups may be referred to as frequency bands, frequency region, or FPs, etc.

Figure 1:
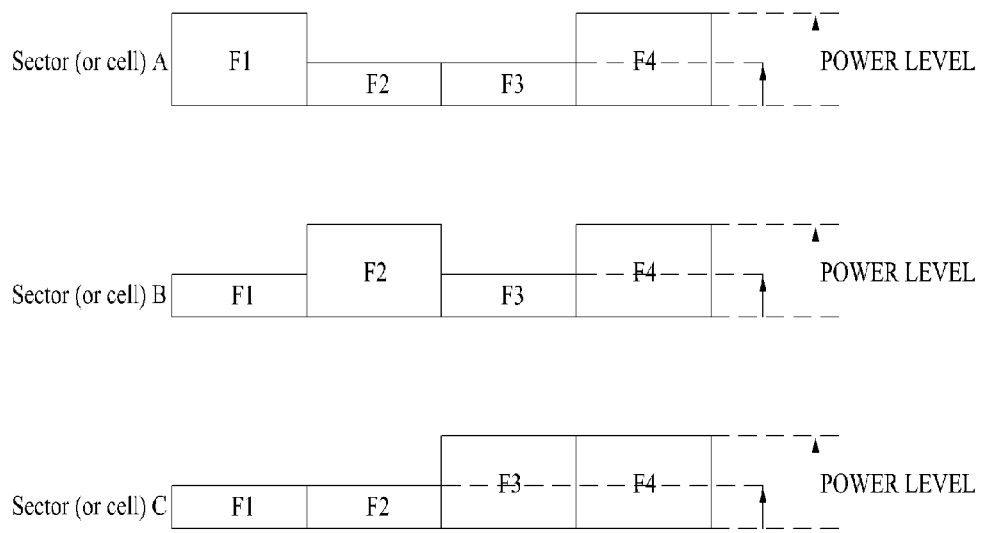
FIG. 1 illustrates an exemplary Fractional Frequency Reuse (FFR) scheme.

FIG. 1 illustrates an exemplary FFR scheme.

Referring to FIG. 1, one cell or sector may generally have four FPs, F1 to F4 across a total bandwidth. The four FPs may be divided into F1, F2 and F3 areas with a frequency reuse factor of 3 (hereinafter, referred to as frequency reuse 3) and an F4 area with frequency reuse 1.

Each cell allocates the F4 area with frequency reuse 1 to users inside of the cell or at the center of the cell, that is, inner users because interference from other cells affects the inner users less than cell-edge users. Therefore, the cell may transmit signals to the inner users in the F4 area (or region) at a high power level.

The cell may allocate the F1, F2 and F3 areas each having frequency reuse 3 to MSs at a cell edge and MSs within the cell. Different cells may allocate different FP areas with frequency reuse 3 to MSs at their cell edges. For example, Cell A may allocate the F1 area with frequency reuse 3 to MSs which are located at its cell edge and thus much vulnerable to inter-cell interference. Then Cell B and Cell C may allocate the F1 area to inner MSs located at the center of the cells and transmit signals to the inner MSs in the F1 area at low power levels. Consequently, the MSs located at the edge of Cell A are less affected by interference from other cells (or neighbor cells) and thus they may efficiently receive downlink signals.

In the same manner, Cell B may allocate the F2 area to users at the edge of Cell B that may be affected significantly by inter-cell interference. Then Cell A and Cell C may allocate the F2 area to inner MSs located at the center of the cells and transmit signals to the inner MSs in the F2 area at low power levels. Consequently, the MSs located at the edge of Cell B are less affected by interference from other cells (or neighbor cells) and thus they may efficiently receive downlink signals.

Cell C may allocate the F3 area to users located at the edge of Cell C that may be affected significantly by inter-cell interference. Then Cell A and Cell B may allocate the F3 area to inner MSs located at the center of the cells and transmit signals to the inner MSs in the F3 area at low power levels. Consequently, the MSs located at the edge of Cell C are less affected by interference from other cells and thus they may efficiently receive downlink signals.

Regarding Cell A, for instance, if the F2 and F3 areas corresponding to frequency reuse 3 partition are allocated to inner users of Cell A, lower power levels may be allocated to the F2 and F3 areas for the inner users than the F1 area allocated to cell-edge users. Accordingly, the inner users using the F2 and F3 areas may receive signals from the serving cell (i.e. Cell A) at low power levels, relative to the cell-edge users.

According to this FFR scheme, each cell may use a relatively high power level for one of the F1, F2 and F3 areas. Preferably, the F1, F2 and F3 areas with relatively high power are allocated to MSs at poor channel state (e.g. cell-edge MSs).

Now a detailed description will be given of a method for controlling the power levels of FPs in FFR scheme.

A SuperFrame Header (SFH) carrying system information will first be described. The SFH includes a Primary SFH (P-SFH) and a secondary SFH (S-SFH). The S-SFH contains mandatory system parameters and system configuration information and is transmitted in three subpackets, SP1, SP2 and SP3. The three subpackets SP1, SP2 and SP3 are periodically transmitted at different times with different periods. The periods $T_{SP1}$, $T_{SP2}$ and $T_{SP3}$ of the subpackets SP1, SP2 and SP3 are in the relationship that $T_{SP1} < T_{SP2} < T_{SP3}$.

Figure 2:
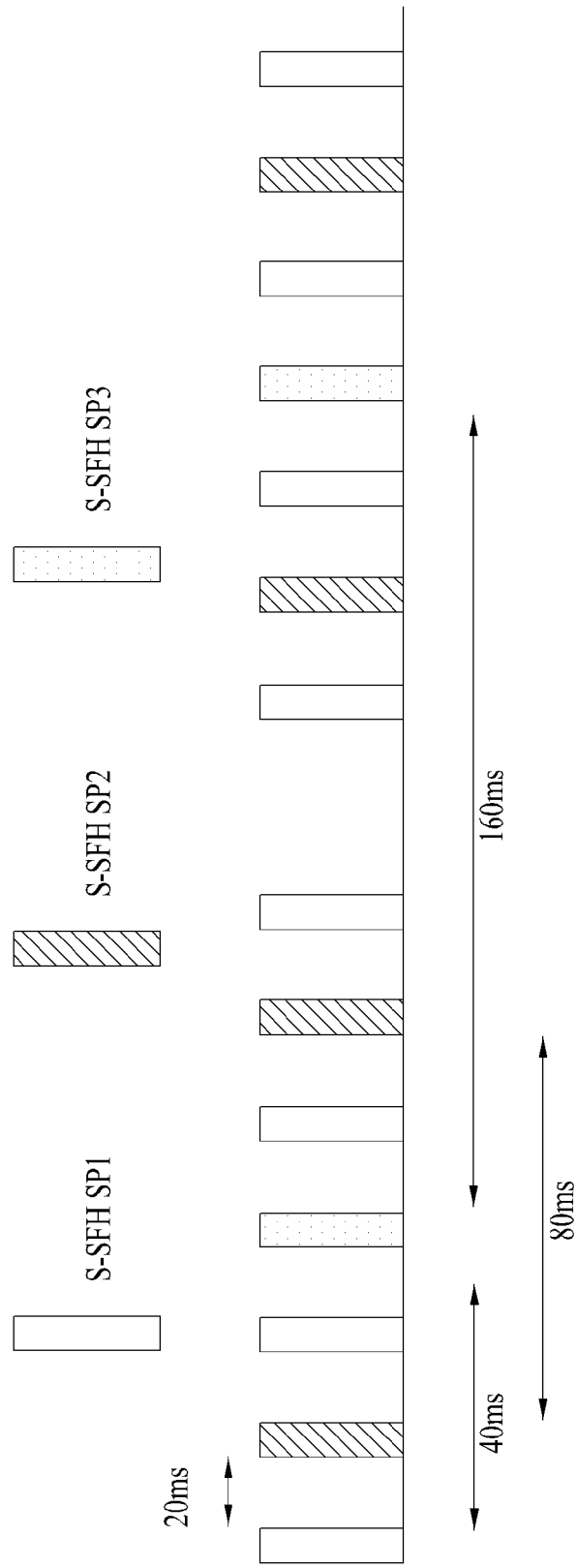
FIG. 2 illustrates exemplary periodic transmission of a first subpacket (SP1), a second subpacket (SP2), and a third subpacket (SP3) of a Secondary SuperFrame Header (S-SFH).

FIG. 2 illustrates exemplary periodic transmission of the first, second and third subpackets SP1, SP2 and SP3 of the S-SFH. Referring to FIG. 2, SP1 is transmitted in a shortest period, whereas SP3 is transmitted in a longest period.

A BS may determine an FP in which downlink control information (e.g. Advanced-MAP (A-MAP) in IEEE 802.16m) is to be transmitted. If FFR is applied to a subframe, the subframe includes FPs and the downlink control information may be transmitted through a reuse-1 FP or a power-boosted reuse-3 FP. The FP carrying the downlink control information may be referred to as a primary FP. Information indicating whether the primary FP is a reuse-1 FP or a reuse-3 FP may be transmitted in 1 bit of SP1 from the BS. For instance, if the bit is 0, this may imply that the primary FP corresponds to partition of frequency reuse 1 and if the bit is 1, this may imply that the primary FP corresponds to partition of frequency reuse 3.

If the bit is 1, an MS needs to know which one of reuse-3 FPs is power-boosted in order to acquire the downlink control information.

Figure 3:
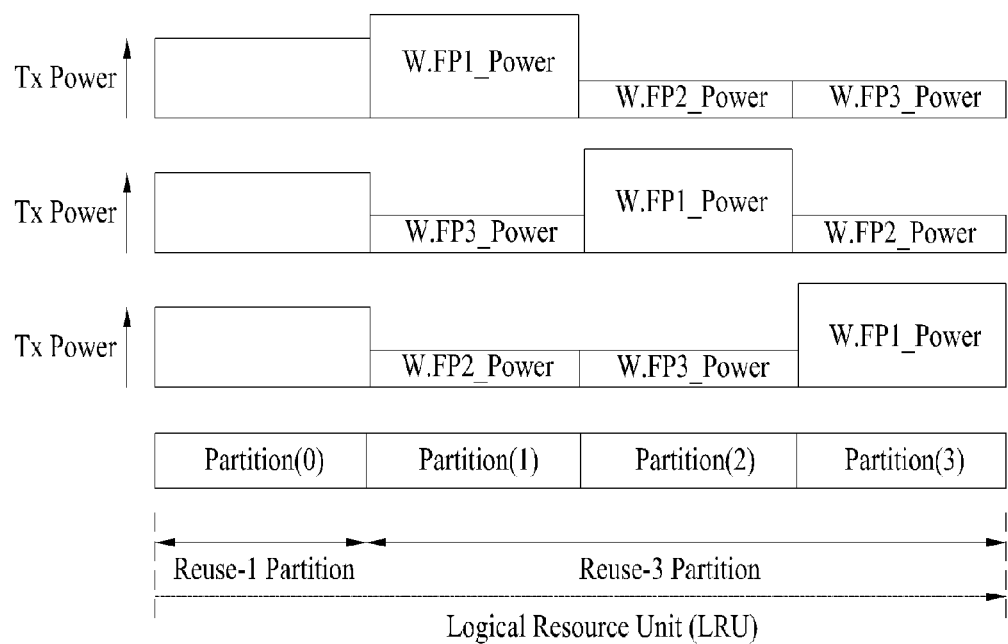
FIG. 3 illustrates power levels of Frequency Partitions (FPs) with frequency reuse 3.

FIG. 3 illustrates power levels of FPs with frequency reuse 3. Referring to FIG. 3, the FFR structure is configured that the FP of frequency reuse 1 is followed by frequency reuse 3 FPs or reuse 2 FPs if frequency partition corresponds to frequency reuse 1 exists. For each cell, each FP has a different transmission power level. When cells operate in FFR, different BSs use different transmission power patterns.

Given four FPs, for instance, each BS may select one of three FFR power patterns (i.e. Cell 1, Cell 2 and Cell 3 patterns), as illustrated in FIG. 3. Each of the three FFR power patterns includes an FP1_Power level FP, an FP2_Power level FP and an FP3_Power level FP.

The index of an FFR power pattern can be set using a segment Identifier (ID) derived from a cell ID by a BS. That is, each BS adopts an FFR power pattern corresponding to a cell k that it covers. k may be determined by the following equation, the k is an index of the FFR power pattern.

$$k = \text{segmentID} + 1 \quad \text{[Equation 1]}$$

The FFR power pattern indicates the positions of FPs having an FP__1 power level, an FP__2 power level and an FP__3 power level, respectively, not indicating the actual power level of each FP.

The actual power level of each FP may be transmitted through broadcast information such as an Advanced Air Interface_Downlink_Interference Mitigation (AAI_DL_IM) message or in SP3 of an S-SFH from a BS. The FP__1 power level, FP__2 power level and FP__3 power level may be predefined in the system and the FP__2 power level and FP__3 power level may be updated. Because the transmission period of SP1 is very short, it may not be preferable to receive the actual power levels of FPs through the broadcast information or the S-SFH SP3, detect a power-boosted FP according to the actual power levels of the FPs, and acquire downlink control information in the detected FP. Notifying a power-boosted FP by additional signaling by the BS may not be preferable either in terms of transmission delay or signaling overhead.

In this context, the present invention proposes that a power-boosted FP among frequency reuse 3 FPs is defined as an FP1_Power level FP.

Therefore, a BS and an MS can know the control information is transmitted through which FP among the frequency reuse 3 FPs. On the part of the MS, the FP carrying control information is known without additional signaling.

While power control has been described above in the context of frequency reuse 3, to which the present invention is not limited, the same thing applies to frequency reuse 2.

Figure 4:
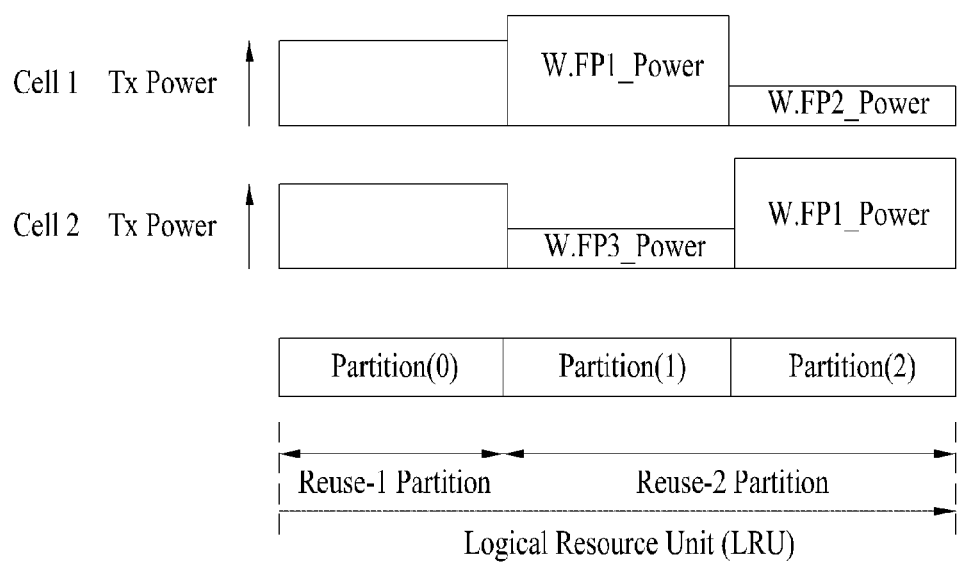
FIG. 4 illustrates FP power patterns for frequency reuse 2.

FIG. 4 illustrates FP power patterns for frequency reuse 2. Referring to FIG. 4, the FFR structure is configured that the FP of frequency reuse 1 is followed by frequency reuse 2 if frequency partition corresponds to frequency reuse 1 exists. For each cell, each FP has a different transmission power level. When cells operate in FFR, different BSs use different transmission power patterns.

For instance, given two FPs, each BS may select one of two FFR power patterns (i.e. Cell 1 and Cell 2 patterns), as illustrated in FIG. 4. The two FFR power patterns are a Cell 1 FFR power pattern including an FP1_Power level FP and an FP2_Power level FP and a Cell 2 FFR power pattern including an FP1_Power level FP and an FP3_Power level FP.

The index of an FFR power pattern can be set using a segment ID derived from a cell ID by a BS. That is, each BS adopts an FFR power pattern corresponding to a cell k that it covers. k may be determined by the following equation, k is an index of the FFR power pattern.

$$k = \text{segmentID} + 1 \quad \text{[Equation 2]}$$

The FFR power pattern indicates the positions of FPs having an FP__1 power level, an FP__2 power level and an FP__3 power level, not indicating the actual power level of each FP. A MS can receive a preamble signal from base station (e.g. serving BS). The MS can acquire FFR power pattern the using the preamble signal received from the BS. Since the FFP power pattern is determined based on segment ID, the MS decode the preamble signal, then may obtain FFR power pattern for serving cell.

The actual power level of each FP may be transmitted through broadcast information such as an AAI_DL_IM message or in SP3 of an S-SFH from a BS. Because the transmission period of SP1 is very short, it may not be preferable to receive the actual power levels of FPs through the broadcast information or the S-SFH SP3, detect a power-boosted FP according to the actual power levels of the FPs, and acquire downlink control information in the detected FP.

Notifying a power-boosted FP by additional signaling from a BS may not be preferable either in terms of transmission delay or signaling overhead.

In this context, the present invention proposes that a power-boosted FP among frequency reuse 2 FPs is defined as defines an FP1_Power level FP.

Therefore, a BS and an MS can know that control information is transmitted through which FP among the frequency reuse 2 FPs. On the part of the MS, the FP carrying control information is known without additional signaling.

The above FFR scheme obviates the need for transmitting additional information indicating the position of a power-boosted FP. Thus signaling overhead is reduced and system performance degradation may be avoided, which might otherwise be caused by additional signaling to indicate the position of the power-boosted FP.

In FFR, a BS selects an FP pattern and controls the transmission power of FPs according to the FP pattern. In general, control information is transmitted in a power-boosted FP. Only when a Mobile Station (MS) is aware of the power-boosted FP beforehand, the MS can acquire the control information.

Figure 5:
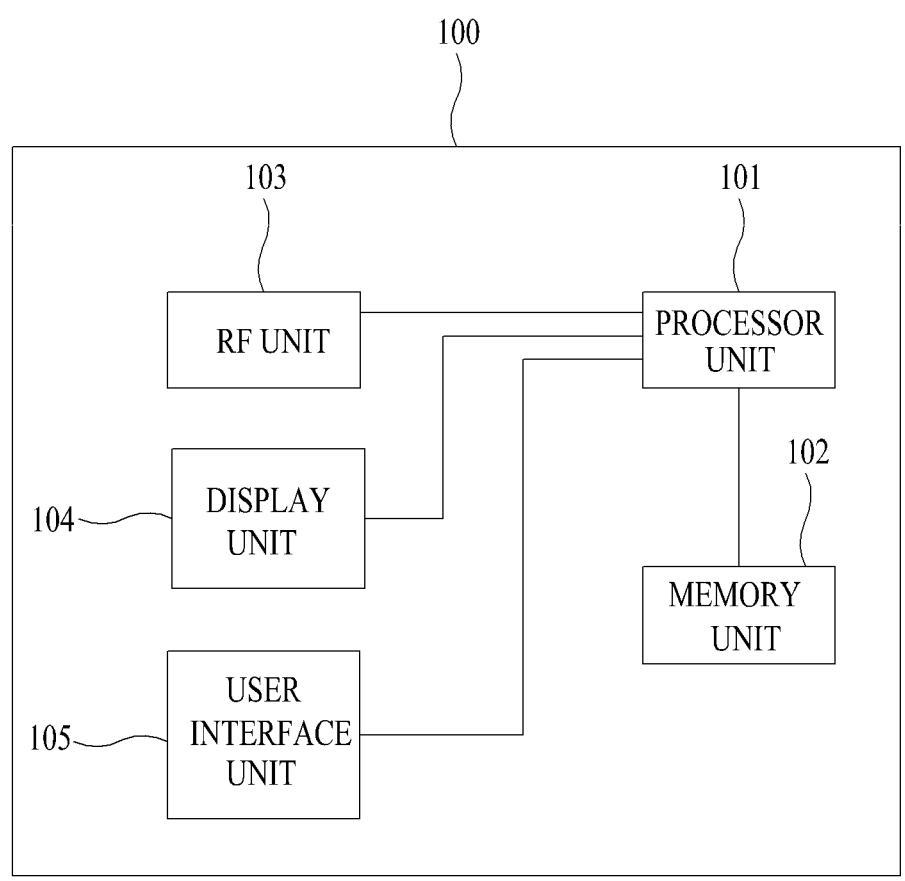
FIG. 5 is a block diagram of a Base Station (BS) apparatus or a Mobile Station (MS) apparatus for performing the present invention.

FIG. 5 is a block diagram of a BS apparatus or an MS apparatus for performing the above-described method according to the present invention.

Referring to FIG. 5, a BS or MS apparatus 100 includes a processor unit 101, a memory unit 102, a Radio Frequency (RF) unit 103, a display unit 104, and a user interface unit 105. The processor unit 101 is responsible for handling physical interface protocol layers. The processor unit 101 provides a control plane and a user plane. The function of each layer may be performed in the processor unit 101. The processor unit 101 may carry out the afore-described embodiments of the present invention. More specifically, the processor unit 101 generates a subframe for determining the position of an MS or determines the position of an MS by receiving the subframe.

The memory unit 102 is electrically connected to the processor unit 101 and stores an operating system, application programs, and general files. If the apparatus 100 is an MS apparatus, the display unit 104 may display various information. The display unit 104 may be a Liquid Crystal Display (LCD), an Organic Light Emitting Diode (OLED) display, etc. The user interface unit 105 may be implemented in combination with a known user interface such as a keypad, a touch screen, etc. The RF unit 103 is electrically connected to the processor unit 101, for transmitting and receiving RF signals. RF unit 103 may include transmitter (not shown) and receiver (not shown).

As is apparent from the above description of the present invention, there is no need for transmitting additional information indicating the position of a power-boosted FP. Thus signaling overhead is reduced and system performance degradation may be avoided, which might otherwise be caused by additional signaling to indicate the position of the power-boosted FP.

The present invention is applicable to an MS, a BS or other equipment in a wireless mobile communication system.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment or may be replaced with corresponding constructions of another embodiment. It will be obvious to those skilled in the art that claims that are not explicitly cited in each other in the appended claims may be presented in combination as an exemplary embodiment of the present invention or included as a new claim by a subsequent amendment after the application is filed.

The term used herein 'MS' may be replaced with the term 'User Equipment (UE)', 'Subscriber Station (SS)', 'Mobile Subscriber Station (MSS)', 'mobile terminal, 'terminal', etc.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Embodiments of the present invention may be achieved by various means, for example, hardware, firmware, software, or a combination thereof.

In a hardware configuration, methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing functions or operations as set forth herein. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It will be obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for acquiring a Fractional Frequency Reuse (FFR) power pattern of Frequency Partitions (FPs) at a mobile station (MS) in a wireless communication system using the FFR, the method comprising:

receiving a super frame header (SFH) from a base station (BS); and acquiring an FFR power pattern for a reuse-1 partition and reuse-N partitions using the received SFH, wherein the FFR power pattern is determined by the equation k=segment identifier (ID) of the BS+1, wherein k is an index of the FFR power pattern, wherein the reuse-N partitions include N FPs, each having a power level with a range of FP1_power level to FPN_power level, and wherein a power level of a power-boosted FP in the reuse-N partitions corresponding to each FFR power pattern is set to the FP1_power level.

2. The method according to claim 1, further comprising:
receiving control information from the base station through the reuse-1 partition or the power-boosted FP in the reuse-N partitions.

3. The method according to claim 1, wherein N is 2 or 3.

4. The method of claim 1, wherein a practical transmission power of each FFR partition is provided via an Advanced Air Interface Downlink_Interference Mitigation (AAI_DL_IM) message or a sub packet 3 (SP3) of a secondary SFH (S-SFH) included in the SFH.

5. A method for controlling transmission power of Frequency Partitions (FPs) at a base station (BS) in a wireless communication system using Fractional Frequency Reuse (FFR), the method comprising:
determining one
FFR power pattern by the equation k=segment identifier (ID) of the BS+1,
wherein k is an index of the FFR power pattern,
wherein reuse-N partitions include N FPs, each having a power level with a range of FP1_power level to FPN_power level, and
wherein a power level of a power-boosted FP in the reuse-N partitions is a corresponding to each FFR power pattern is set to the FP1_power level.

6. The method according to claim 5, further comprising:
transmitting control information to a mobile station through a reuse-1 partition or the power-boosted FP in the reuse-N partitions.

7. The method according to claim 5, wherein N is 2 or 3.

8. The method of claim 5, wherein a practical transmission power of each FFR partition is provided via an Advanced Air Interface Downlink_Interference Mitigation (AAI_DL_IM) message or a sub packet 3 (SP3) of a secondary SFH (S-SFH) included in the SFH.

9. A mobile Station (MS) apparatus in a wireless communication system using Fractional Frequency Reuse (FFR), the MS apparatus comprising:
a radio frequency (RF) unit for receiving a superframe header (SFH) from a base station (BS); and
a processor unit for acquiring an FFR power pattern for a reuse-1 partition and reuse-N partitions using the received SFH,
wherein the FFR power pattern is determined by the equation k=segment identifier (ID) of the BS+1,
wherein k is an index of the FFR power pattern,
wherein the reuse-N partitions include N frequency partitions, each having a power level with a range of FP1_power level to FPN_power level, and
wherein a power level of a power-boosted FP in the reuse-N partitions corresponding to each FFR power pattern is set to the FP1_power level.

10. The MS apparatus according to claim 9,
wherein the RF unit is further for receiving control information from the BS through the reuse-1 partition or the power-boosted FP in the reuse-N partitions.

11. The MS apparatus according to claim 9, wherein N is 2 or 3.

12. A base Station (BS) apparatus in a wireless communication system using Fractional Frequency Reuse (FFR), the BS apparatus comprising:
a processor unit for determining one FFR power pattern; and
a radio frequency (RF) unit for transmitting a superframe header (SFH) to a mobile station (MS),
wherein the FFR power pattern is determined by the equation k=segment identifier (ID) of the BS+1,
wherein k is an index of the FFR power pattern,
wherein reuse-N partitions include N Frequency Partitions (FPs), each having a power level with a range of FP1_power level to FPN_power level, and
wherein a power level of a power-boosted FP in the reuse-N partitions corresponding to each FFR power pattern is set to the FP1_power level.

13. The BS apparatus according to claim 12,
wherein the RF unit is further for transmitting control information to the MS through the reuse-1 partition or the power-boosted FP in the reuse-N partitions.

14. The BS apparatus according to claim 12, wherein N is 2 or 3.

* * * * *